(12) United States Patent
Choi

(10) Patent No.: US 8,395,841 B2
(45) Date of Patent: Mar. 12, 2013

(54) REFLECTIVE PROJECTION SCREEN HAVING MULTI-INCEDENT ANGLE

(76) Inventor: Hae-Young Choi, Seoul (KR)

( * ) Notice: Subject to any disclaimer, the term of this patent is extended or adjusted under 35 U.S.C. 154(b) by 0 days.

(21) Appl. No.: 13/179,589

(22) Filed: Jul. 11, 2011

(65) Prior Publication Data

US 2012/0008202 A1 Jan. 12, 2012

(30) Foreign Application Priority Data

Jul. 12, 2010 (KR) .................. 10-2010-0066698

(51) Int. Cl.
*G03B 21/56* (2006.01)
(52) U.S. Cl. .................... 359/459; 359/443; 359/451
(58) Field of Classification Search .......... 359/15, 359/443, 449, 451, 459
See application file for complete search history.

(56) References Cited

U.S. PATENT DOCUMENTS

| | | | | |
|---|---|---|---|---|
| 1,526,715 A * | 2/1925 | Moon et al. | .................. | 359/451 |
| 3,260,156 A * | 7/1966 | Komitor | .................. | 359/445 |
| 3,408,132 A * | 10/1968 | Chandler et al. | .............. | 359/451 |
| 3,653,740 A * | 4/1972 | Ogura et al. | .................. | 359/443 |
| 4,089,587 A * | 5/1978 | Schudel | .................. | 359/451 |
| 4,277,136 A * | 7/1981 | Schudel | .................. | 359/451 |
| 4,380,368 A * | 4/1983 | Ohmata et al. | ............... | 359/443 |
| 5,127,722 A * | 7/1992 | Nishitani | .................. | 359/443 |
| 5,414,558 A * | 5/1995 | You | .................. | 359/451 |
| 6,064,521 A * | 5/2000 | Burke | .................. | 359/443 |
| 6,574,041 B1 * | 6/2003 | Chen | .................. | 359/459 |
| 6,600,600 B2 * | 7/2003 | Chen | .................. | 359/459 |
| 6,724,529 B2 * | 4/2004 | Sinkoff | .................. | 359/443 |
| 7,057,812 B2 * | 6/2006 | Sinkoff | .................. | 359/449 |
| 7,180,663 B2 * | 2/2007 | Collender et al. | ........... | 359/451 |
| 7,227,683 B2 * | 6/2007 | Choi | .................. | 359/443 |
| 7,362,502 B2 * | 4/2008 | Choi | .................. | 359/449 |
| 7,495,828 B2 * | 2/2009 | Ishii | .................. | 359/449 |
| 7,583,437 B2 * | 9/2009 | Lipton et al. | ................. | 359/451 |
| 2002/0196538 A1 * | 12/2002 | Lantz et al. | ................. | 359/443 |
| 2003/0038925 A1 * | 2/2003 | Choi | .................. | 353/79 |
| 2006/0209405 A1 * | 9/2006 | Sinkoff | .................. | 359/459 |
| 2007/0133089 A1 * | 6/2007 | Lipton et al. | ................. | 359/451 |
| 2008/0117506 A1 * | 5/2008 | Choi | .................. | 359/449 |
| 2009/0190210 A1 * | 7/2009 | Coleman et al. | .............. | 359/452 |
| 2011/0164321 A1 * | 7/2011 | Lee et al. | ..................... | 359/599 |
| 2012/0008202 A1 * | 1/2012 | Choi | .................. | 359/459 |

FOREIGN PATENT DOCUMENTS

KR 20050011633 1/2005

* cited by examiner

*Primary Examiner* — Clayton E LaBelle
*Assistant Examiner* — Kevin Butler
(74) *Attorney, Agent, or Firm* — Bacon & Thomas, PLLC

(57) ABSTRACT

A reflective projection screen for receiving images, for a projector having short focal length of short projection distance, and particularly a reflective projection screen applicable to 2D and 3D imaging. The reflective projection screen has multi-incident angles where every reflection surface is prepared from a projection angle of the projected image and where incident angles are formed differently from each reflection surfaces so that the projection images from different angles are reflected into one direction.

10 Claims, 13 Drawing Sheets

REFLECTIVE PROJECTION SCREEN HAVING MULTI-INCEDENT ANGLE

CROSS-REFERENCE(S) TO RELATED APPLICATION

This application claims priority of Korean Patent Application No. 10-2010-0066698, filed on Jul. 12, 2010, in the Korean Intellectual Property Office, which is hereby incorporated by reference in its entirety.

BACKGROUND OF THE INVENTION

1. Field of the Invention

The present invention relates to a reflective projection screen for image, and more particularly, to a method of fabricating a reflective projection screen for a projector having a short focal length of a short projection distance and a shape thereof, which is applicable to 2D and 3D imaging. In particular, embodiments of the present invention relates to a reflective projection screen having multi-incident angles wherein every reflection surface is prepared per projection angle of projection image and incident angles are formed differently from each reflection surfaces and further the reflection surface has no reflection layer so that the projection images projected from different angles are reflected into one direction.

2. Description of the Related Art

Generally, a 2 dimensional (2D) image refers to a plain moving picture or a video image. Meanwhile, a 3 dimensional (3D) image refers to a cubic image, where there are typically two ways of showing the cubic image using a projector. In one way, polarized images are projected through left-right polarizing plates provided before projection lens of left and right projectors and the images are viewed through 3D glasses provided with left and right polarizing plates. The other way uses a glass-shutter where left image and right images are projected alternatively in sequence from a projector which is then received by 3D glasses. The alternating signals received by the 3D glasses controls the alternating opening and closing of the left and right glass lens based on the left and right images on a screen and synchronizing signal in the classes to view the cubic image.

However, referring to the polarizing manner as described above the image has to be sent to the polarizing glasses in a state of polarization to maintain a 3D image and further, referring to the glass shutter manner, the shutter is driven to view the 3D image such that the signal, such as infrared light from a projector, has to be projected to a screen and reflected from the screen to reach a infrared light sensor provided in the 3D glass. For this reason, referring to the polarizing manner, which is usually used in a theater, the screen for receiving the polarized image is extremely limited and thus 2D and 3D theater screens have to be separately prepared due to the light reflection of the screen.

When the images are polarized, only 25% of image light is transmitted through a polarizing plate of a projector and 25% of the image light is transmitted through 3D glass and thus only 12.5% of the image light is viewed on the screen. Accordingly, the polarization degree decreases to 12.5%.

Meanwhile, when the 3D image is viewed using shutter plates, since left and right images are projected in sequence alternatively from a projector, 50% of the image light is transmitted, having a transmission rate of 50%, and 30% of the image light is transmitted through the shutter glasses and thus 15% of the image light is viewed on a screen. Accordingly, the infrared light signal for synchronizing the shutter decreases dramatically to 15%. For this reason, the brightness of the 3D image decreases which dramatically lowers the definition thereof and thus the 3 dimensional feeling. Furthermore, when a user views the dark image for a long time, the user's eyes would become tired and the user develops a headache. Thus there is need to develop brighter screen.

U.S. Pat. No. 7,227,683 and U.S. Pat. No. 7,362,502, which were filed by the present applicant, disclose the use of the reflective screen and spherical screen which are considered to be 20 times brighter than conventional screens wherein as shown in FIG. 4 of the present application, when a projector is placed on a focal point (f) of a spherical screen 1a, the image is reflected straightly from the spherical screen 1a and thus a reverse angle range (e) is enlarged to fit an entire screen size, thereby diminishing a hot spot appearance and increasing brightness uniformity.

The spherical screen 1a is applied efficiently to a 3D cubic image as well as a 2D image, however, when a projector of a short focal distance is used, a radius of curvature formed by a short focal point limits the screen size. That is, as shown in FIG. 5, a focal distance (projection distance) f is r/2, and thus r=2f. Accordingly, when f becomes shorter, r becomes smaller; therefore, the screen size g also becomes smaller. The screen size is determined within the range g formed by 2 times curvature having the projection distance of the projector having a short focal distance point, which projects in a short distance, and thus the picture size decreases as much as the projection distance is shortened, and makes it impossible to have a larger size screen configuration.

Additionally, referring to the spherical screen a thin film screen which is rolled up, i.e., rollable, such as a roll screen, cannot be used due to a curvature depth of a spherical surface. For example, a screen configuration using Fresnel reflection lenses for refracting and reflecting images using a prism configuration, the image has to be transmitted through the prism medium for both refraction and reflection even when a reflection surface is provided on a rear surface thereof. Here, it has been also disclosed that when the image is transmitted through the prism medium, a refraction rate of polarization degree varies and thus it cannot be applied to 3D image. In particular, in the Fresnel configuration, as shown in FIG. 14, it has been disclosed in "Optical" in page 374 (translation by Kwon Yong Dae) that the polarization degree decreases by a half-wave from point p and thus a picture size cannot be enlarged in contrast to the focal point distance. Accordingly, the screen thickness may be formed as a thin film in the Fresnel configuration, however, the larger screen than the focal point distance cannot be fabricated.

Therefore, the screen using Fresnel reflection, as shown in FIG. 6, cannot be applied with a projector having a short focal distance under a large screen.

That is, since the projector having a short focal distance has to be placed on a middle axis of a Fresnel reflection screen for normal operation, i.e., it has to be applied to a transmissive screen. However, when the projector having a short focal distance is placed on a middle part of a screen, view of the image is blocked and thus is not practical. In particular, when the image is transmitted through the transmissive medium of the Fresnel screen, the polarization degree of the cubic 3D image collapses and thus it prevents the use of the Fresnel screen as a 3D screen.

Additionally, Korean Patent Application No. 10-2003-0051853, which was filed by the present applicant, discloses a high refraction reflective screen, as shown in FIG. 7 wherein the images incident from several angles are not reflected in a straight manner at the same angle but reflected in a diffuse manner to the incident direction. Accordingly, reverse angle e of a reflection angle to a screen height is small and thus a hot spot phenomenon in which a brightening of a part of the screen prominently occurs. Additionally, reflection angles are diffused depending on incident angles and it acts as a mirror which changes reflection direction and thus brightness uniformity is poor and picture brightness is different depending on the reflection angle, thereby making it impossible to be used as a screen. In particular, a polarization degree of polarized 3D image is diffused and thus it can be used only finitely as a 3D cubic screen.

Meanwhile, referring to a projection distance of a general projector, the projection distance is 4-5 m based on a lateral length 2 m of the screen and thus a ratio of the projection distance to the lateral length of the screen is 2-2.5: 1.

However, when the projection distance becomes longer as described above, there arises a problem in that the projector and the screen are arranged separately. Further, the prior projector having a long projection distance occupies a large installation area, thereby making it difficult to install at home.

SUMMARY OF THE INVENTION

Embodiments of the invention are proposed to solve the drawbacks as described above of the prior art, and one object of the invention relates to providing a reflective projection screen having multi-incident angles and more particularly, to a method of fabricating a reflective projection screen for a projector having a short focal length, i.e., a short projection distance, and particularly to a reflective projection screen applicable to 2D and 3D imaging.

Recently, a projector having a projection distance of 30-50 cm which is 0.15-0.2: 1 of the projection distance to a picture lateral length, based on a screen lateral length of 2 m, has been proposed in the market. The projection distance of 30-50 cm is referred to as ⅕-1/10 level. Here, the short focal point projector minimizes a distance between a screen and the projector and thus it may be installed and used conveniently. However, a projection angle thereof is large and wide and thus it has to be applied only to a prior scattered screen of less than 1 gain and not to a conventional reflective screen and spherical screen in which brightness increases.

Meanwhile, referring to a general screen 1a, as shown in FIG. 1, Snell's reflection rule which states that "an incident angle a equals to a reflective angle b reflected from a screen" is applied thereto. That is, in a prior projector 2a, as shown in FIG. 2, a ratio of a projection distance to a picture lateral length is about 2-2.5:1, which increases the projection distance. Accordingly, the incident angle a and the reflection angle b are small and thus light projected from the general projector 2a is reflected easily to a viewer or a location of 3D glasses D.

However, according to an embodiment of the present invention as shown in FIG. 3, a main light source of a short focal point projector 2 placed under a plane reflective screen 1a is reflected from the reflective screen toward a ceiling location and thus a dark image may be viewed during 2D viewing and further a 3D image cannot be viewed since an image reflection angle does not reflect the image to the 3D glasses location.

Furthermore, there is a problem of a prior plane reflective screen in that spot phenomenon occurs in which a bright spot partly appears and moves throughout a whole surface of the screen. This spot occurrence makes it impossible for the prior art reflective screen to be used as a screen since a bright light source projected from a projector lamp is not diffused due to the reflective surface and is reflected directly on the screen.

Accordingly, in order to eliminate the hot spot appearance as described above and further achieve brightness uniformity of the screen through a spherical screen, the projector 2 according to one embodiment of the present invention, having a short focal point distance of 0.2-0.5 times of picture size, has to be placed on a focal point of the spherical screen where the screen has a curvature. Therefore, the picture size is limited to within the curvature r formed by the projection distance of a projector and the projection distance of the short focal distance projector 2 becomes as small as ⅕ to 1/10 times that of the prior art and thus the picture size becomes as small as ⅕ to 1/10 times as the prior art screen size.

Additionally, a spherical surface of smooth curvature r has to have more than 2-6 times the projection distance than the picture size to be formed in order to show the projected image on a screen. In the case of a spherical screen having a short projection distance, however, the curvature r becomes as deep as the shorter projection distance and image distortion occurs, thereby not enabling the use of a spherical screen to be used as a 2D image or 3D image screen.

Accordingly, the object of the present invention cannot be achieved through a configuration of the prior spherical reflective screen and thus it needs a novel reflective screen configuration through which brightness on the screen is increased and hot spot appearance is eliminated and further polarity degree is kept.

The present invention has been proposed in consideration of the points as described wherein a reflective surface with multi-incident angles is provided for use with a projector having the short focal point to have a screen as much as 4 times larger than the projection distance of the short focal point projector. Further, the reflective screen has uniform bright images without having hot spots appearing. At the same time, the object of the present invention provides a reflective screen of a thin film type with multi-incident angles through which brightness as much as 4 to 30 times than that of the prior art screen is obtained and further 2D image and 3D image can be shown thereon.

Meanwhile, according to one embodiment of the present invention, a reflective screen of a thin film type 1 is provided and further a short focal point projector 2 having a short projection distance is provided below the screen, as shown in FIG. 8. Here, the screen is made of a reflective screen 1 wherein, as shown FIGS. 9(a), 9(b) and 10, a height h of the reflective screen 1 is divided into several parts spaced between about 0.1-30 mm intervals to form reflective surfaces c per a finely divided line. In addition, the divided reflective surfaces c each is provided with an inclined surface having an inclined angle 3 that are different from each other wherein each inclined angle 3 is positioned to have angles from more than about 1° to less than about 45°, based on a location and a direction of the short focal point projector 2, per a line of the reflective surface c. Meanwhile, as shown in FIGS. 9(a), 9(b), 10, 11(b) and 12(b), steps such as saw teeth of the respective inclined angle 3, which are formed on surfaces of the plain screen, can be removed and the reflective surface c having the inclined angle 3 is transferred to a plain screen surface, and thus each 2D image or 3D image from the short focal point projector 2 which is incident from different angles is reflected in a straight path toward the direction of the viewer or 3D glasses D.

As shown in FIG. 11(a), the reflective surface c can be arrayed in a circular form wherein the circular form has an eccentric axis 5 from a direction of the short focal point projector 2 and further a reflection rate of the reflection surface is 2-30%. Additionally, as shown in FIG. 12(a), a scattering surface 4 which scatters the images leftward and rightward is provided on the reflective surface c and further the reflective surface c is provided in a left and right direction and the projected images are divided per projection angle to reflect the projected image toward one direction wherein the reflective surface c is provided on each projection angle unit, and incident angles are different from each reflective surface c. That is, the screen has multi incident angles for viewing both 2D and 3D images.

According to one embodiment of the present invention, as indicated as g in FIG. 5, a short focal point projector is provided and further the projector and a screen are formed integrally and a projection distance is decreased as much as 1/5-1/10 times that as the prior art screen, thereby dramatically decreasing the installation area. Furthermore, the inclined angle 3 is increased gradually with respective different incident angle a on the divided reflective surface C and thus the image projected toward a viewer or 3D glasses D through the gradually accumulated incident angle a is reflected in a straight direction which reduces the hot spot appearance to have a more uniform brightness. In addition, the reflection rate of the whole screen is increased to make the screen 2-30 times (2-30 gain) brighter than the prior art screen even when the screen has a plain surface.

Meanwhile, referring to a size of the reflective screen 1, as shown in FIG. 10, the height h of the screen is divided into intervals of the reflective surface c where each reflective surface has a size of 0.1-30 mm forming several lines, thereby enabling the imaging of a large picture regardless of the curvature r range of the prior spherical screen. As a result, a large screen that is more than 4 times the size of the prior spherical screen can be obtained while having equal projection distance.

Here, unit interval of the reflective surface c is 0.1-30 mm and the inclined angles thereof are formed within 1-45°, and thus a thickness of the reflective surface C per unit can have a thin configuration S, as shown in FIG. 9(b), compared to the thickness T of the prior spherical screen, as shown in FIG. 9(a). That is, the thickness T of 50 cm of the projection screen can be decreased to 0.1-30 mm of unit interval of the reflective surface, and thus a thin film configuration S, which can have as small as 1/5000 times that of the prior spherical screen, can be obtained.

Furthermore, according to another embodiment of the present invention, when the thin film screen is made of flexible material such as film, it may be rollable as a roll screen.

Particularly, 2D or 3D images can be projected on a screen without picture distortion using the thin film screen. Through this refracted-reflective configuration the image may be refracted and reflected, which when compared to a general prism has an increased brightness while being able to keep the polarity degree of light projected from a 3D projector. Accordingly, a shutter synchronizing signal or polarity degree for a 3D image is increased by as much as 4-30 times than that of the prior screen and clearness degree of the cubic image is increased to as the same as the polarity degree and thus any cubic images and 2D images can be viewed.

It is to be understood that both the foregoing general description and the following detailed description are exemplary and explanatory and are intended to provide further explanation of embodiments of the invention as claimed.

DETAILED DESCRIPTION OF EXEMPLARY EMBODIMENTS

The preferred embodiments of a reflective screen with multi-incident angles will be described in detail referring to the accompanied drawings. However, it has to be understood that embodiments of the invention are not limited to the preferred embodiments described hereafter.

Figure 8:
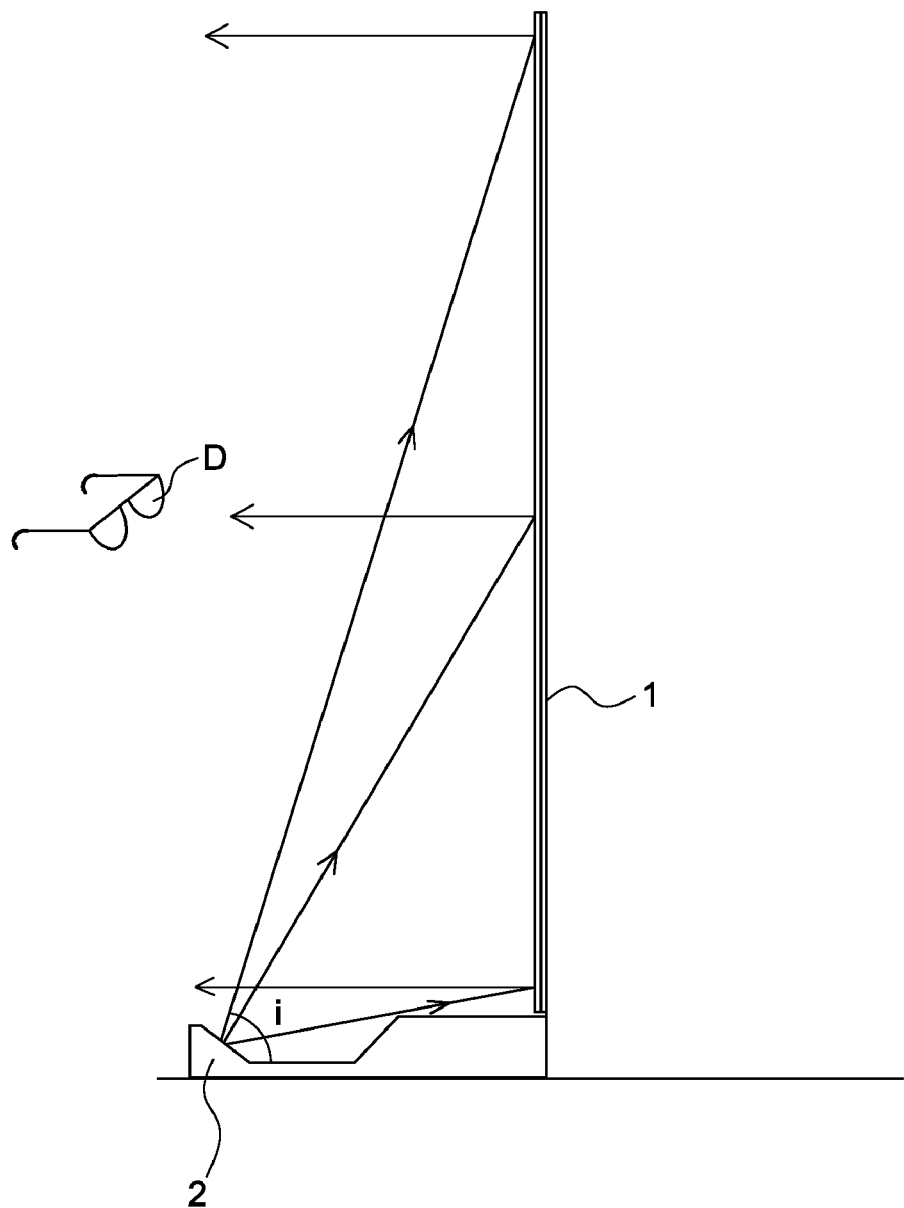
FIG. 8 shows schematically a reflective screen with multi incident angles according to one embodiment of the present invention.

The present invention relates to a reflective screen having multi-incident angles. FIG. 8 shows a reflective screen 1 formed as a thin film and is provided with a short focal point projector 2 on a lower part of the screen. Here, according to one embodiment of the present invention, the reflective surface C having a curvature r of a spherical screen is divided into predetermined intervals where respective reflective surfaces c are formed in each interval with an inclined surface. The inclined surface is slanted at an inclined angle 3 ranging from about 1° to 45°, which starts from 1° at a location near the bottom portion of the screen, i.e., near the placement of the short focal point projector 2 to less than 45° near a top portion of the screen. The reasons for configuring the inclined angle 3 in an range from more than 1° to less than 45° are that a viewing angle from the short focal point projector 2 to the lower part of the reflective screen 1 has to be ensured for more than 1° and maximum inclined angle 3 of the reflective surface for reflecting the image incident vertically at a right angle is 45°.

Additionally, the reflective surface c can have a reflection rate between about 2-30% by adjusting the left and right scattering lines so that brightness can increase by as much as 4-30 times than that of the typical screen of a gain (reflection rate 1%). As the reflection rate becomes higher, the interval of the reflective surface has to become smaller, whereas the reflection rate becomes lower, the interval of the reflective surface may be larger. The range of the interval, however, has to be within 0.1-30 mm. Here, the thickness s of the reflective screen with multi-incident angles according to the present invention has a thickness of the reflection surfaces c having the inclined angles between 1° and 45° allowing the screen to have a thin film configuration. Additionally, since the reflection rate of the reflection surface c is at about 2-30%, the remaining surface 70-98% has to become a scattering surface. Accordingly, a configuration of the scattering surface, as shown FIGS. 11(*c*), 12(*c*) and 12(D), left and right scattering lines 4 for scattering light properly left-rightward may be formed on the reflective surface c.

Figure 13:
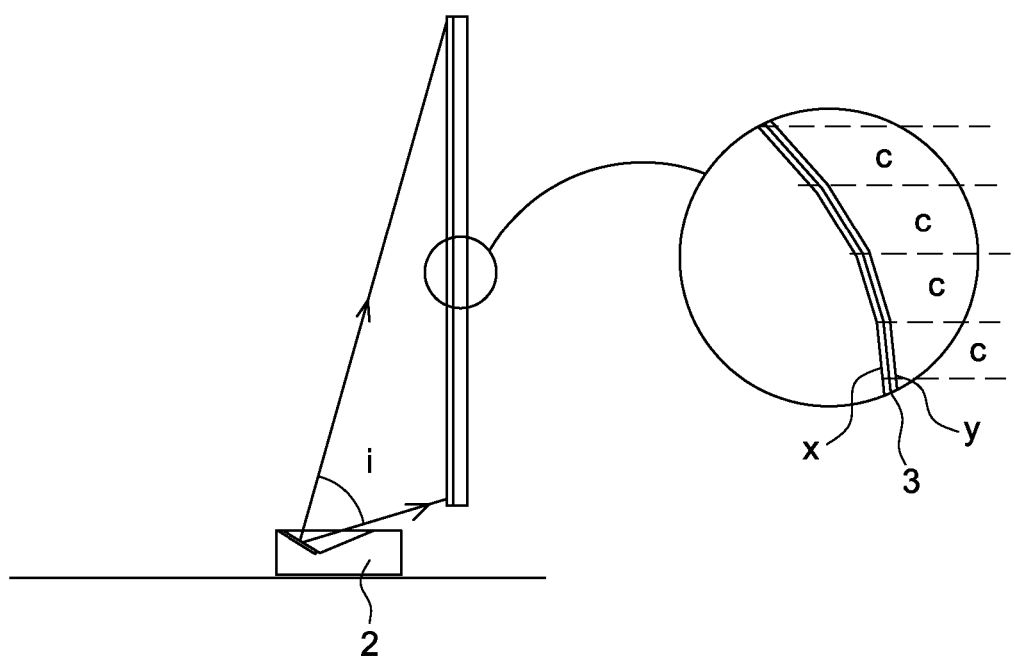
FIG. 13 shows schematically a screen configuration according to one embodiment of the present invention, which is formed as thin film.
Figure 14:
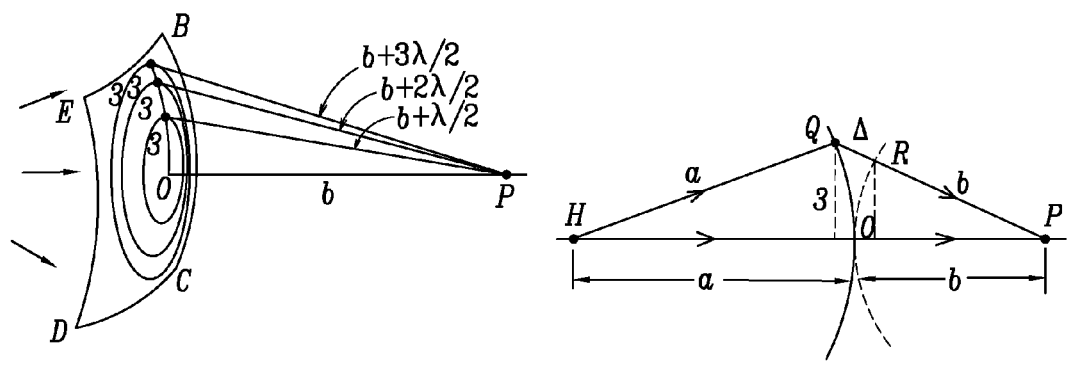
FIG. 14 shows schematically Fresnel operation for reference ("Optical" in page 374 translated by Kown Yong Dae)

In addition, as shown in FIG. 13, according to one embodiment of the present invention, the reflective surface c can be formed within a transparent material and the screen may be formed as roll screen to keep the inclined angle 3 of the reflective surface c and in this case the scattering lines 4 for scattering image light in the left and right directions may be formed on a rear surface or front surface of the transparent material. Here, according to one embodiment of the present invention a polarizing angle of 3D image from the short focal point projector 2, which is polarized and projected by a polarizing plate is kept on a surface of the reflective screen 1 to enable the viewing of both the 2D image and the 3D image.

In a configuration of the present invention, a surface configuration of the reflective screen 1 is important and more detailed description including numerals is given below.

Example 1

As shown in FIG. 8, the height h of the reflective screen 1 is 1240 mm which is derived from the lateral length×height of a picture ratio of 16:9 for use with a typical HD TV and thus has a diagonal of 2540 mm (100″) and a lateral length of 2210 mm and the height of 1240 mm. Accordingly, the height h of the reflective screen 1 is equal to 1240 mm. When the lower part of the reflective screen 1 is arranged about 5° above the height h of the short focal point projector 2, the maximum height of the reflective screen 1 equals to 1300 mm, which is derived from 1240 mm plus 60 mm. Additionally, when the projection distance f of 100″ of the short focal point projector 2 is 500 mm, a projection range i which is projected on the reflective screen with the short focal point projector 2 equals to tan ∠=screen height h/projection distance of short focal point and thus the projection angle at the top end of the reflective screen 1 equals to 70° and the projection range i is 65° between 5° and 70°.

Figure 9:
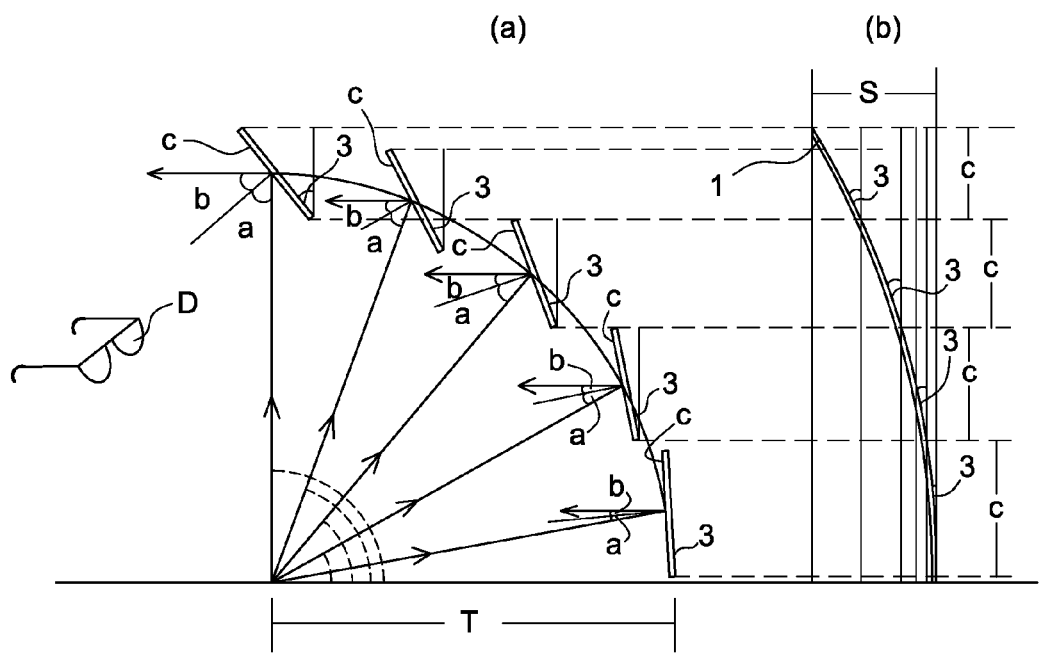
FIG. 9(a) shows schematically a reflective surface and an inclined angle in the reflective screen with multi incident angle according to one embodiment of the present invention.
FIG. 9(b) shows schematically the inclined angle shown in FIG. 9(a), which is provided on a plain surface.

Meanwhile, interval of the reflective surface c, as shown in FIGS. 9(*a*), 10, 11(*a*), 11(*b*), 12(*a*) and 12(*b*), is defined from more than 0.1 mm to less than 30 mm. Here, when the interval of the reflective surface c is defined to be less than 0.1 mm, the area of the reflective surface c is too small, decreasing reflection efficiency. However, when the interval of the reflective surface c is defined to more than 30 mm, reflection interval of the image becomes wider and thus respective different reflection angles may be formed therein, decreasing brightness uniformity of the reflective screen c. When the image is a 2D image such as a video image, the interval of the reflection surface c is defined to be between 0.1 mm and 5 mm. Further, when the image is large and is viewed from a remote distance such as an advertising image, the interval of the reflection surface c may be between 5 mm and 30 mm wherein it may be larger or smaller depending on picture size.

According to one embodiment of the present invention, the interval of the reflective surface c is defined to be about 5 mm and hereinafter description thereof will be made based on the interval size 5 mm.

When the interval size of the reflective surface c is 5 mm, the height of the reflective screen 1 is 1300 mm and thus there are 260 of the reflective surfaces c, which is calculated by taking the height of the screen divided by the height of each reflective surface, i.e., equals 1300 mm/5 mm. In addition, each reflective surface c has an inclined angle 3 equaling different increments of 0.25° which is calculated by taking the total projection degree and dividing by the number of lines, i.e., 65°/260 lines. That is, a reflection angle b of the first line of the reflective surface c is 5°±0.25°=5.25°. Furthermore, the reflection angle b of the tenth line of the reflective surface c is 5°+)(10×0.25°=7.25° and the reflection angle b of the 260$^{th}$ line of the reflection surface c is 5°+(260×0.25°) ≈70°. However, the inclined angle 3 of the reflection surface c is a half of the reflection angle. That is, when the reflection angle to incident angle is 90°, the inclined angle 3 of the reflection surface c becomes 45° based on a normal line. Accordingly, as shown in FIG. 10, an arrangement angle of the reflection surface c of the first line is 5°±0.25°=5.25°×1/2=2.625° and the arrangement angle of the reflection surface c of 100$^{th}$ line is {5°+(100×0.25°)}×1/2=15° and further the inclined angle 3 of the 260$^{th}$ line of the reflective surface c is {5°+(260×0.25°)}×1/2=35°.

That is, the inclined angle 3 of the reflective surface c, namely the arrangement angle ranges from about 2.625° to about 35° at from the first line to the 260$^{th}$ line wherein 0.125° is increased per line in sequence depending on increasing number of the reflective surface c. Here, a shape of the reflective surface c, as shown in FIG. 11(*a*), is formed as a circle wherein a central axis is an eccentric axis 5 since the short focal point projector 2 is placed on a lower end of a screen and thus a center of the circle has to be placed on the lower end of the screen to properly apply the eccentric axis for the incident angle basis.

In summary, according to one embodiment of the present invention, as shown in FIG. 9(*a*), a projector projects images that are multi-incident to the reflective surface c at respective different projection angles a and are divided into 260 lines. Each image separately has different incident angles varying in 0.25° increments and reflected straightly on the reflection surfaces c, where each reflection surface c has different inclined angle 3 of 0.125° increments, where all images are directed toward a viewer or a location D of a cubic glass. Here, the reflection surface c which is divided into 260 lines pursuant to a method as shown in FIG. 9*a*), is transferred to a plain configuration as shown in FIG. 9(*b*), thereby enabling a formation of a thin film structure. In more detail, as shown in FIG. 9, the reflective surfaces c each having different reflective angles may form a reflective layer of a step structure such as saw teeth per the reflective surface c. Here, the reflective layer of the step structure as described above may interrupt the projected image from the short focal point lens, which is incident to a high angle of the reflective surface c, thereby making the entire picture dark and/or uneven. Therefore, the reflective layer is transferred to a plain configuration, i.e., smooth, as shown in FIG. 9(*b*) by keeping the reflective angle, thereby forming a plain configuration of a thin film in which there is a reflective angle but there is no reflective layer as in the step screen structure.

Figure 10:
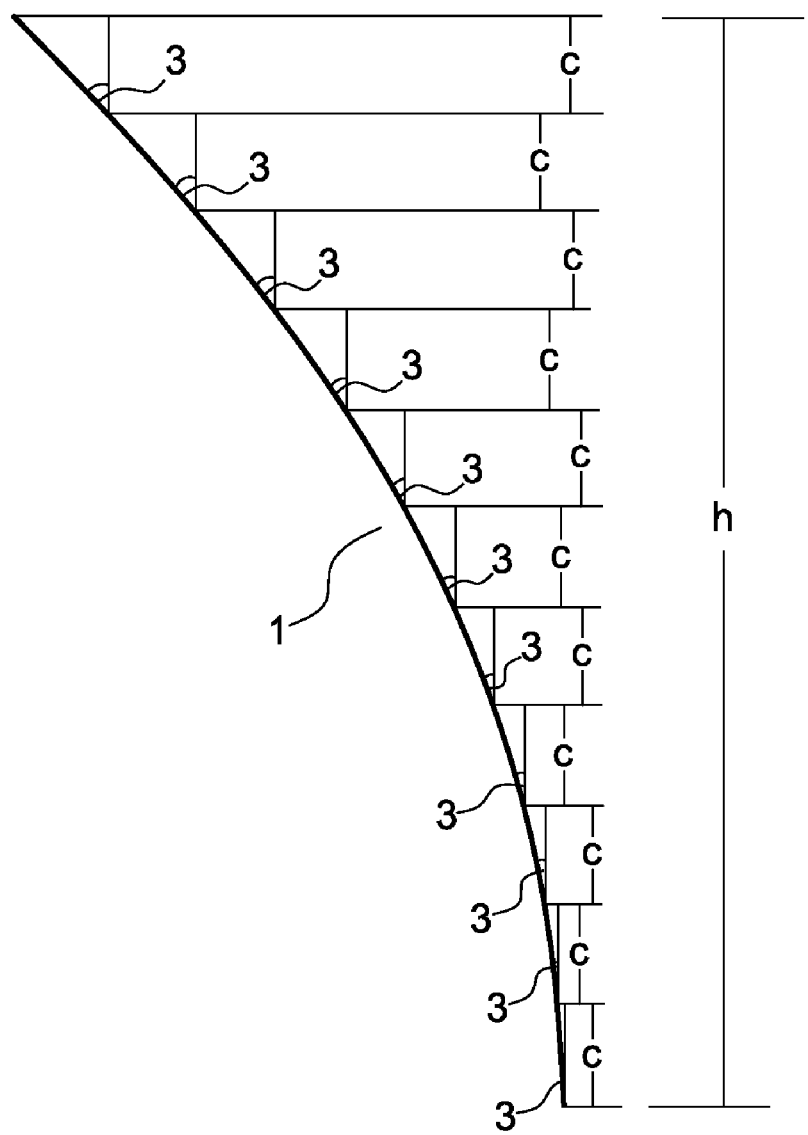
FIG. 10 shows schematically a reflective surface and inclined angle provided on a plain surface in the reflective screen with multi incident angles according to one embodiment of the present invention.
Figure 11:
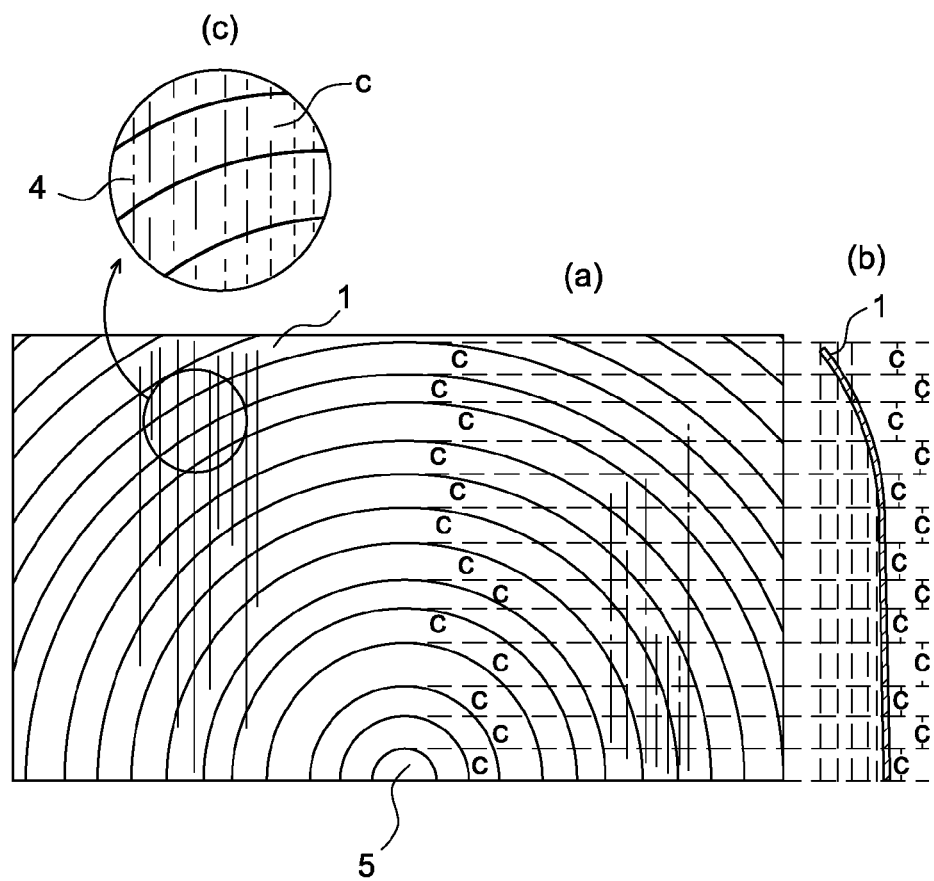
FIG. 11(a) shows schematically the reflective surfaces formed as eccentric circles.
FIG. 11(b) shows schematically the reflective surface shown in FIG. 11(a) transferred to a plain surface.

FIGS. 10, 11(*b*), and 12(*b*) show the same configuration as FIG. 9(*b*). According to one embodiment of the present invention, the brightness on the reflective surface c which is divided into 260 lines is uniform and the hot spot phenomenon is eliminated by forming left and right sides of the reflective surface in a circle. Accordingly, a bright picture having a high brightness can be obtained.

Meanwhile, as shown in FIG. 9(b), length of the reflective surface c is enlarged and moved into a surface of a plain screen so that the height h of the reflective screen 1 can be enlarged, as shown in FIG. 10, and further technical advantages the same as spherical screen can be obtained through a thin film screen, not limiting to curvature r.

In addition, all reflective screens 1 each having different sizes such as 80" reflective screen 1 or 200" reflective screen 1 may be applied to the aforementioned principles. Besides, when the short focal point projector 2 is placed on the upper end of the reflective screen 1, the aforementioned principle may be applied adversely.

Example 2

Figure 12:
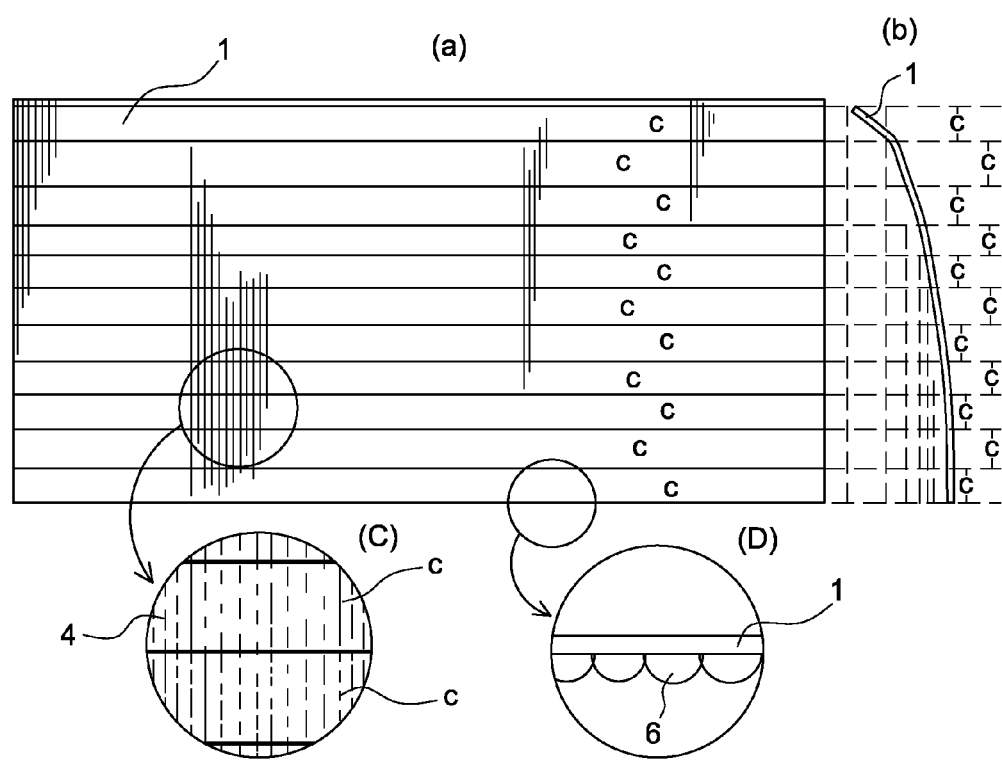
FIG. 12(a) shows schematically the reflective surface according to the present invention, which is configured horizontally leftward and rightward.
FIG. 12(b) shows schematically the reflective surface shown in FIG. 11(a), which is transferred to a plain surface.

When the line of the reflective surface c is configured in the manners as described above such that as shown in FIG. 12, where the lines are arranged left to right horizontally, the appearance of hot spots may occur in left to right directions. However, when the reflection rate of the reflective screen 1 is defined to 2-8 gains of comparatively low level, left-right scattering lines 4 may be formed on a surface of the reflective screen 1, as shown in FIG. 12(a), or curved lines of a lenticular form may be formed up-downward for the image to be diffused left-rightward so that left-right hot spot appearance can be avoided. In this case, of course, the configuration of the reflective surface c is configured such that the inclined angles 3 of the reflective surface c depending on the incident angles a are calculated from separate different lines which are made by dividing up the reflective surface. According to the present invention, the projected images are reflected themselves through refraction and reflection of the reflective surface c formed on a surface of the reflective screen 1 and thus a clear image may be obtained when a cubic image is displayed through polarized projection.

Example 3

Figure 1:
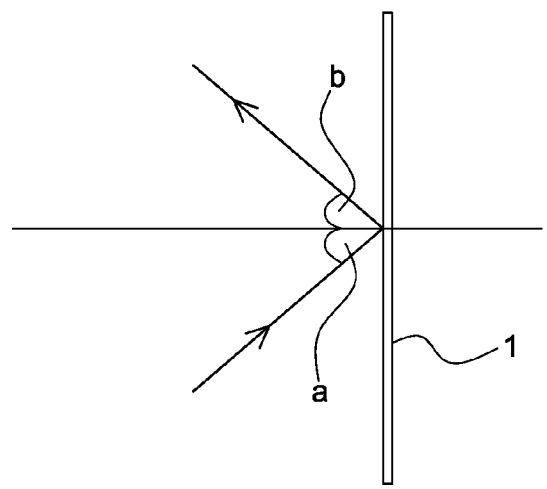
FIG. 1 shows schematically an incident angle and reflective angle on a reflective screen.
Figure 2:
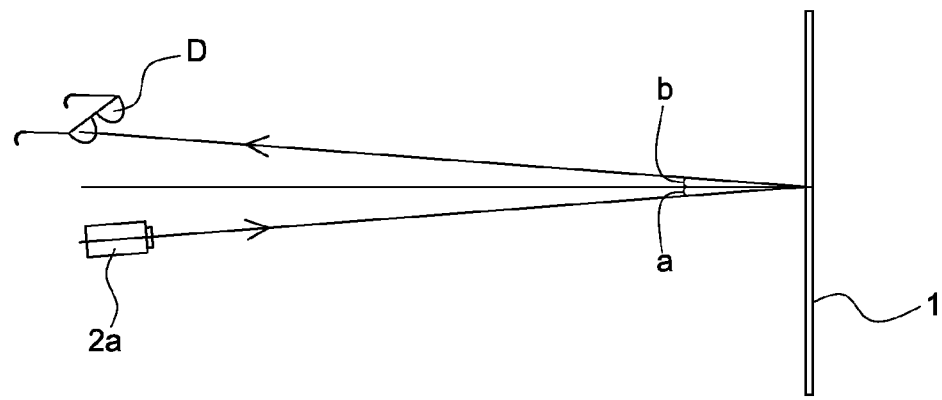
FIG. 2 shows schematically a projection distance of a prior projector.
Figure 3:
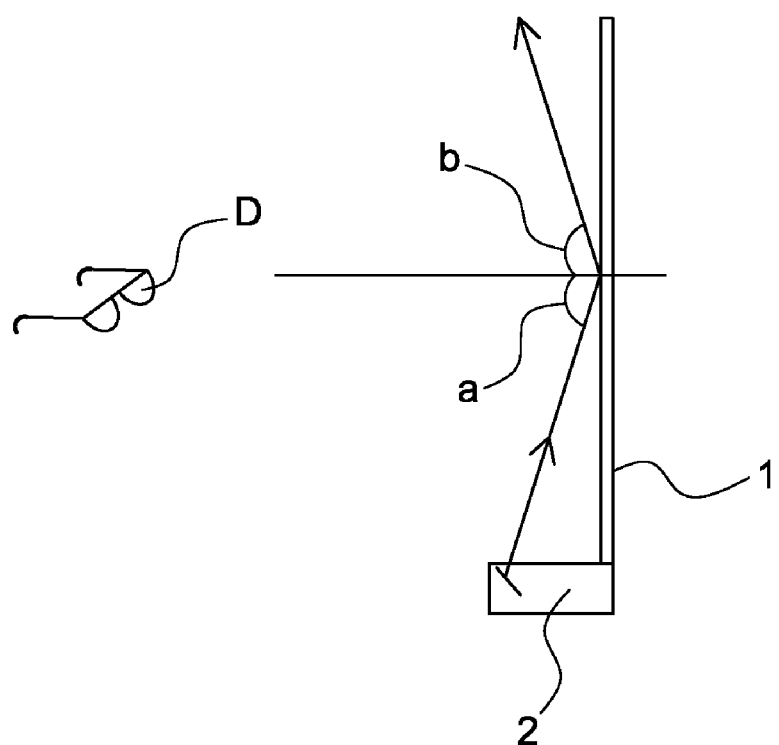
FIG. 3 shows schematically an incident angle and reflective angle when a short focal point projector is provided according to one embodiment of the present invention.
Figure 4:
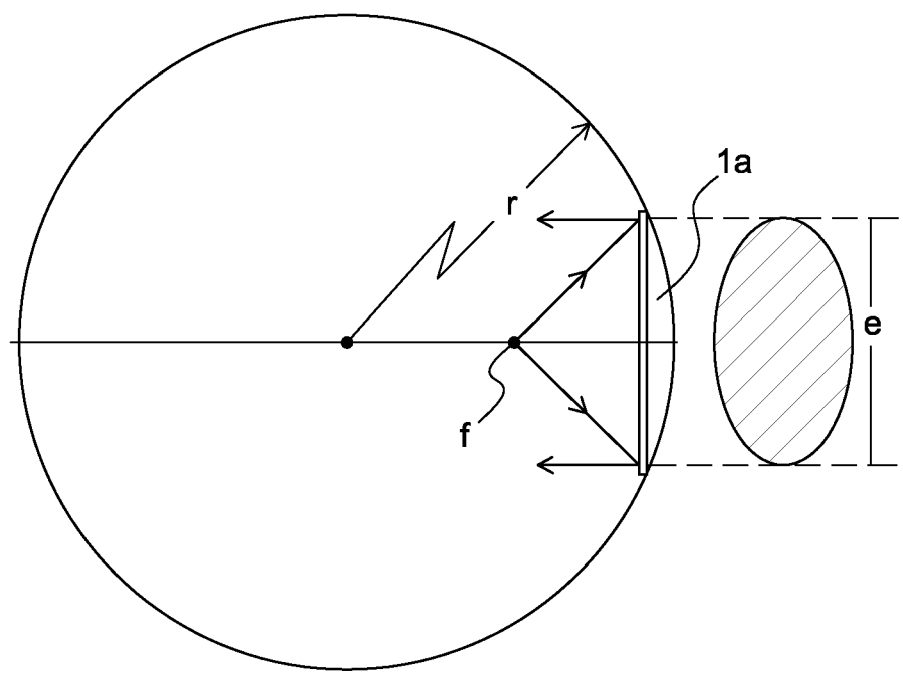
FIG. 4 shows schematically a spherical screen and a hot spot.
Figure 5:
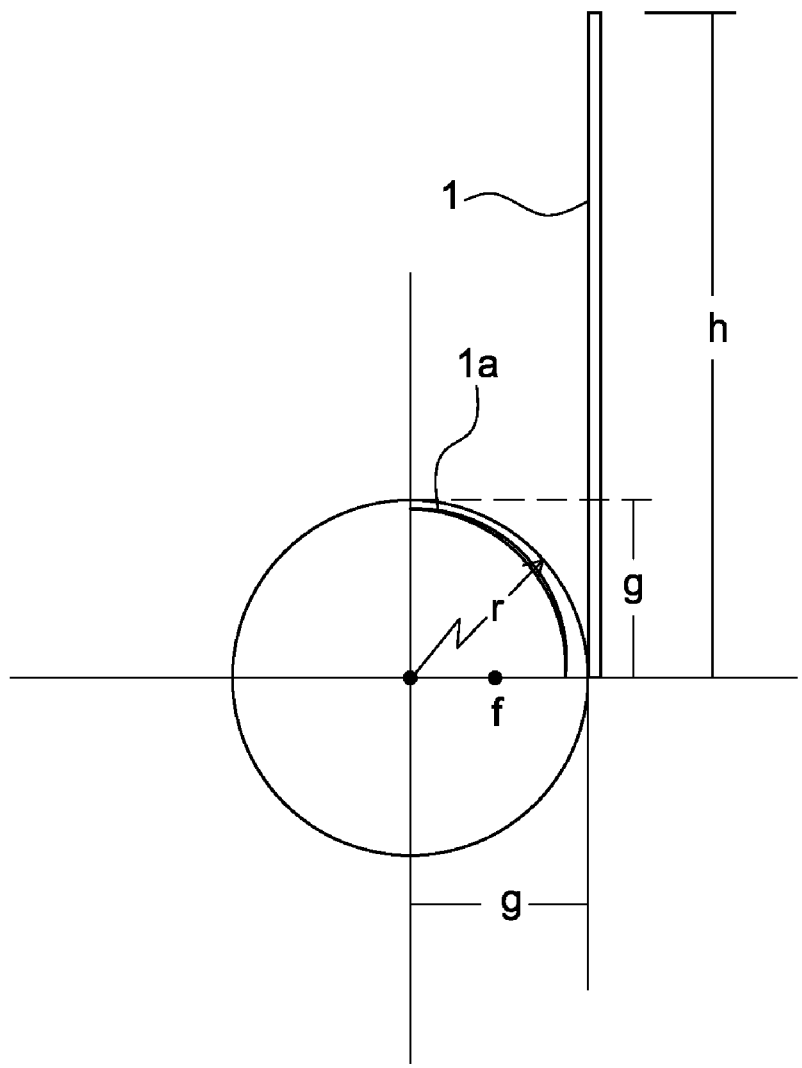
FIG. 5 shows schematically a size of the short focal point spherical screen and a size of the reflective screen.
Figure 6:
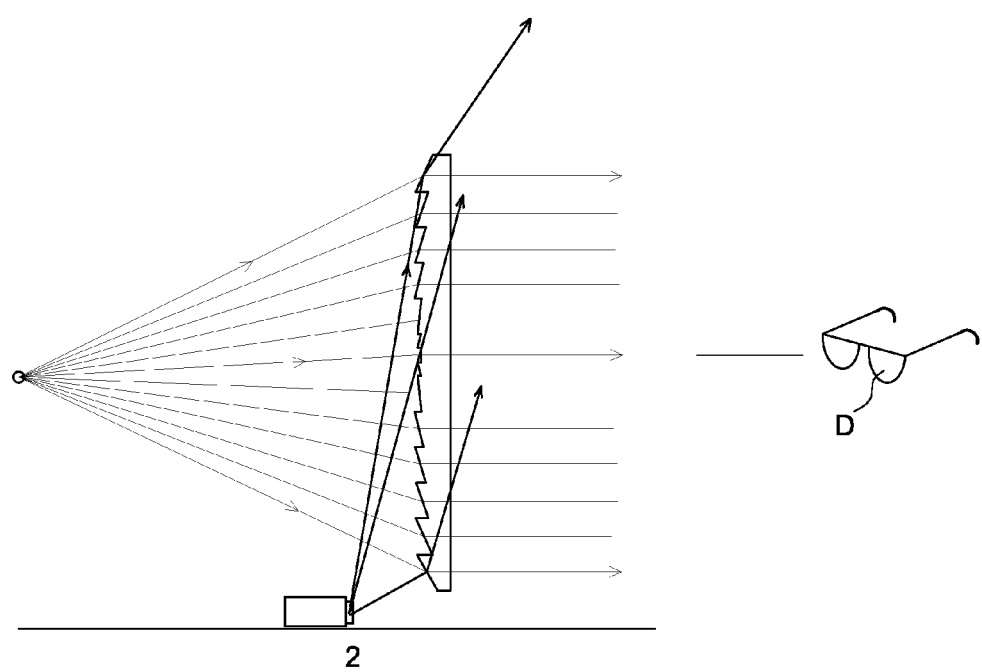
FIG. 6 shows schematically an operation of a Fresnel screen.
Figure 7:
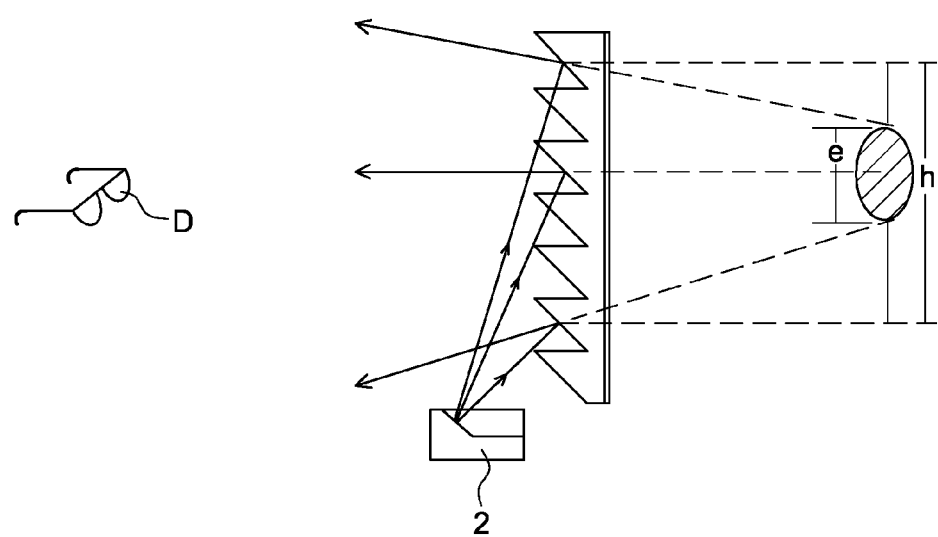
FIG. 7 shows schematically a reflective operation and a hot spot appearance of a prism surface screen.

The aforementioned structure may be formed as a thin film screen such as the reflective screen 1, as shown in FIG. 13. That is, the interval of the reflective surface c is defined from about 0.1-30 mm. Furthermore, the arrangement of the inclined angle 3 is defined as being less than 1-45° and thus the thickness of the reflective screen 1 may be formed between 0.1-30 mm as a thin film. That is, the thickness per unit of the reflective surface c may be formed as thin film S, as shown in FIG. 9(b), compared to the thickness T of the prior spherical screen, as shown in FIG. 9(a). In other words, when a projector having a short focal point distance of 50 cm is used, the thickness T of the spherical screen becomes 1 m, as shown in FIGS. 5 and 9(a).

According to one embodiment of the present invention, the thickness T of the spherical screen of the reflective screen is divided into 0.1-30 mm of the interval of the reflective surface and the reflective surface is transferred to a plain screen configuration, as shown in FIGS. 9 (b) and 10, and thus the thickness of the thin film configuration S may also be formed between about 0.1-30 mm.

Additionally, as shown in FIG. 13, a surface of the reflective screen 1 may be made of transparent material X and a rear surface thereof is made of protective film and the reflective surface c is made therebetween. At this time, the transparent material X has to have a refraction rate that is 1.5 times that of the reflective surface c so that polarity degree of 3D image can be maintained. Meanwhile, even when the screen according to the present invention is formed as a roll screen, the inclined angle 3 is to be kept.

Accordingly, the reflective screen 1 may be made from a flexible material such as film or plastic resin for easy installment and transportation to form a rollable screen. Additionally, the reflective screen according to the present invention may be combined with a short focal point projector as shown in FIG. 8, and thus the screen and the projector may be formed integrally, and further a large screen may be formed without having a hot spot phenomenon, regardless of whether it has a short projection distance of the short focal point projector. Finally, when a 2D or 3D image is selected and projected by a 3D projector, 2D or 3D images can be selected and viewed on one screen, and further a brighter 2D or 3D image of 2-30 gains can be viewed through one thin film screen and thus it may be applied to a home theater for 2D and 3D, a screen game unit for 2D and 3D and advertizing unit, etc.

While embodiments of the invention are described referring to the preferred embodiments, the invention is not limited thereto, and thus various variation and modification can be made without departing from a scope of the invention.

What is claimed is:

1. A reflective projection screen having multi-incident angles comprising:
a plain screen surface having a smooth curved surface forming a reflection screen;
said reflection screen configured to receive images from a short focal point projector in a manner such that the received images are reflected in a horizontal direction to a viewer, wherein said reflection screen has a height that is equally divided along the height of the reflection screen into a plurality of reflection surfaces, and
each reflection surface of said plurality of reflection surfaces having a height between about 0.1 to 30 mm, and each reflection surface having a different inclined angle ranging from about 1 degree to about 45 degrees along said reflection screen,
wherein each reflection surface is configured to reflect the received images from the short focal point projector in the horizontal direction towards the viewer, and wherein said different inclined angles of the reflection surfaces increases from a lower portion to an upper portion of the reflection screen in a way such that the plurality of reflection surfaces are connected to form the smooth curved surface of the reflection screen, and
wherein each reflection surface is arrayed as an eccentric circle.

2. The reflective projection screen having multi-incident angles according to claim 1, wherein each of the reflection surfaces has a reflection rate from about 2% to about 30%.

3. The reflective projection screen having multi-incident angles according to claim 1, including scattering surfaces formed on the curved surface of the reflection screen, said scattering surfaces configured to scatter image light from the received images in leftward and rightward directions, relative to a viewer.

4. The reflective projection screen having multi-incident angles according to claim 1, including scattering surfaces formed on the curved surface of the reflection screen, said scattering surfaces configured in a way such that a polarizing angle of a 3D image from the short focal point projection is maintained.

5. The reflective projection screen having multi-incident angles according to claim 1, wherein the reflection screen is made from flexible material to form a rollable screen.

6. A reflective projection screen having multi-incident angles comprising:
- a plain screen surface having a smooth curved surface forming a reflection screen;
- said reflection screen configured to receive images from a short focal point projector in a manner such that the received images are reflected in a horizontal direction to a viewer, wherein said reflection screen has a height that is equally divided along the height of the reflection screen into a plurality of reflection surfaces, and
- each reflection surface of said plurality of reflection surfaces having a height between about 0.1 to 30 mm, and each reflection surface having a different inclined angle ranging from about 1 degree to about 45 degrees along said reflection screen,
- wherein each reflection surface is configured to reflect the received images from the short focal point projector in the horizontal direction towards the viewer, and wherein said different inclined angles of the reflection surfaces increases from a lower portion to an upper portion of the reflection screen in a way such that the plurality of reflection surfaces are connected to form the smooth curved surface of the reflection screen, and
- wherein each reflection surface is a horizontal row formed along a length of the reflection screen.

7. The reflective projection screen having multi-incident angles according to claim 6, wherein each of the reflection surfaces has a reflection rate from about 2% to about 30%.

8. The reflective projection screen having multi-incident angles according to claim 6, including scattering surfaces formed on the curved surface of the reflection screen, said scattering surfaces configured to scatter image light from the received images in leftward and rightward directions, relative to a viewer.

9. The reflective projection screen having multi-incident angles according to claim 6, including scattering surfaces formed on the curved surface of the reflection screen, said scattering surfaces configured in a way such that a polarizing angle of a 3D image from the short focal point projection is maintained.

10. The reflective projection screen having multi-incident angles according to claim 6, wherein the reflection screen is made from flexible material to form a rollable screen.

* * * * *